Nov. 25, 1930.                H. W. ORNDOFF                1,782,935
                             BAG TURNING MACHINE
                              Filed May 8, 1928            5 Sheets-Sheet 1
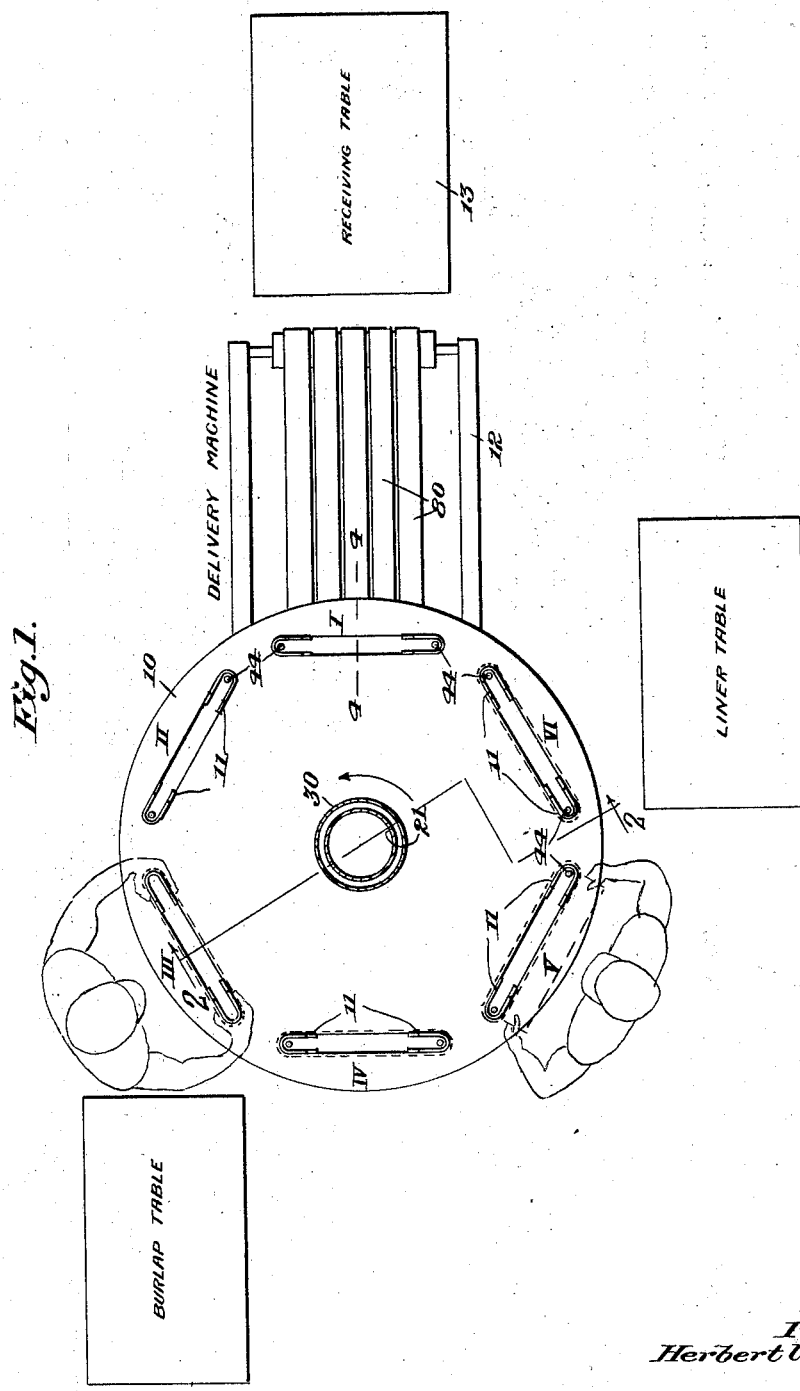
Inventor:
Herbert W. Orndoff,
By Stuntevant & Mason
Att'ys.

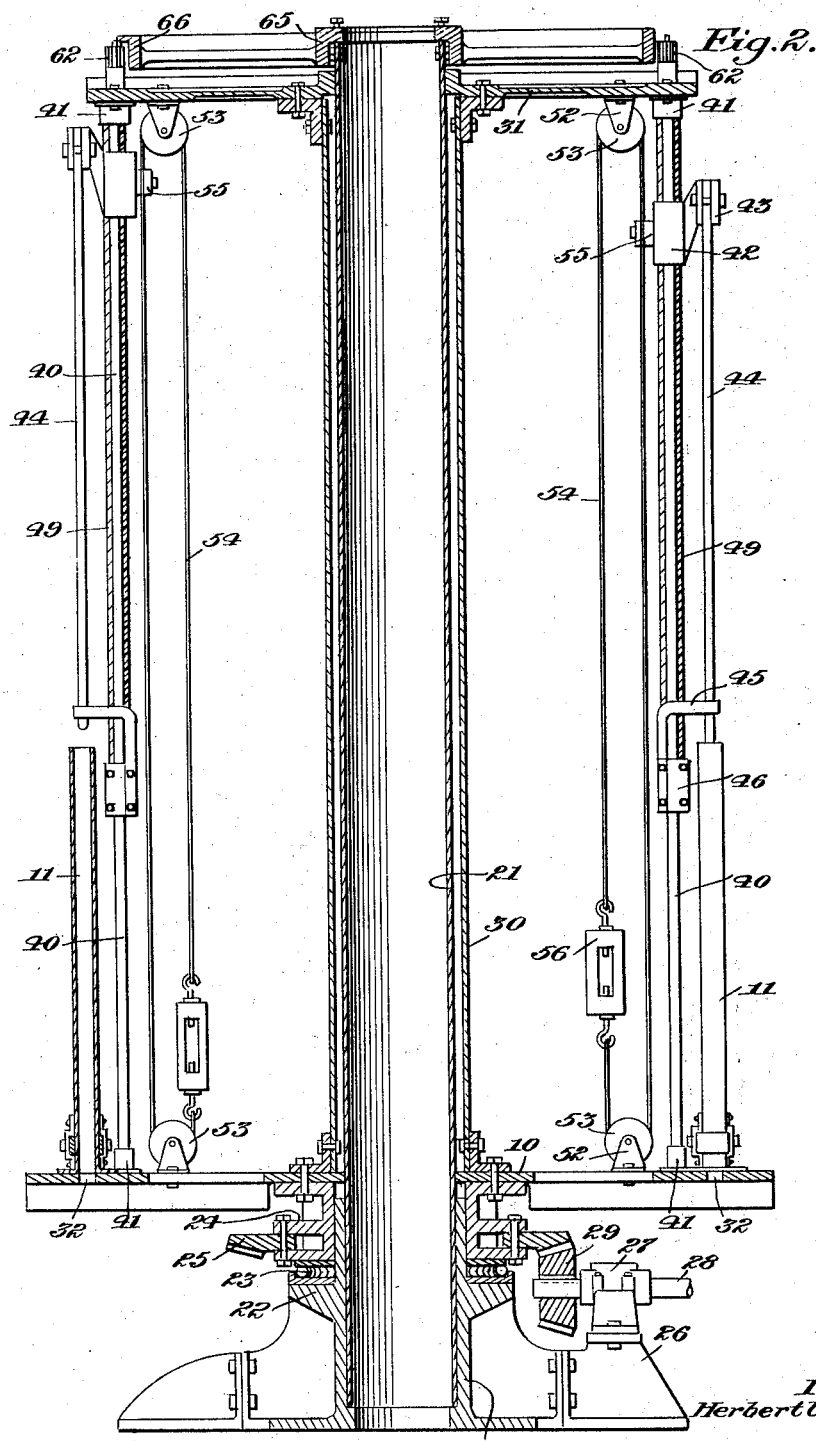

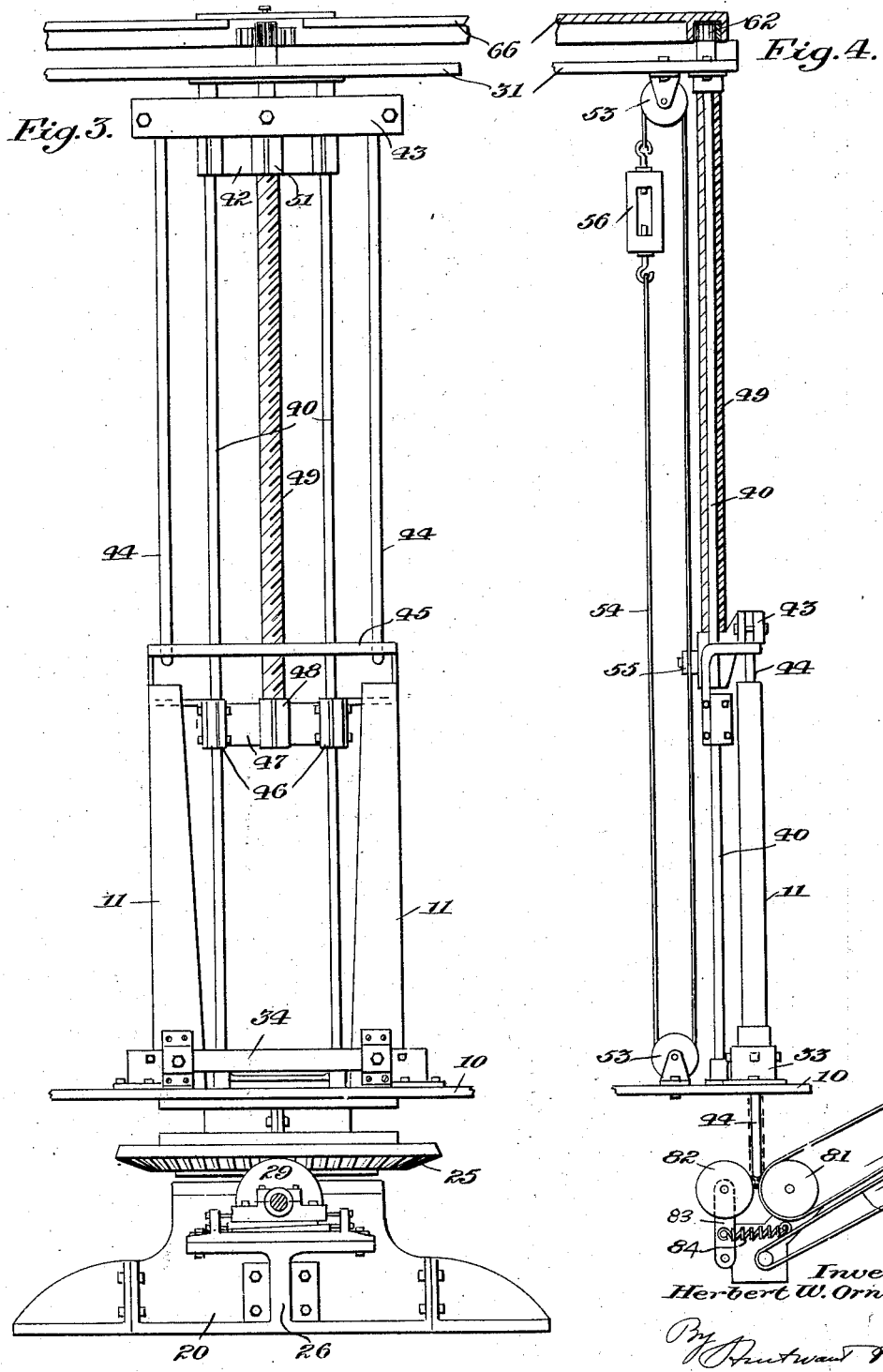

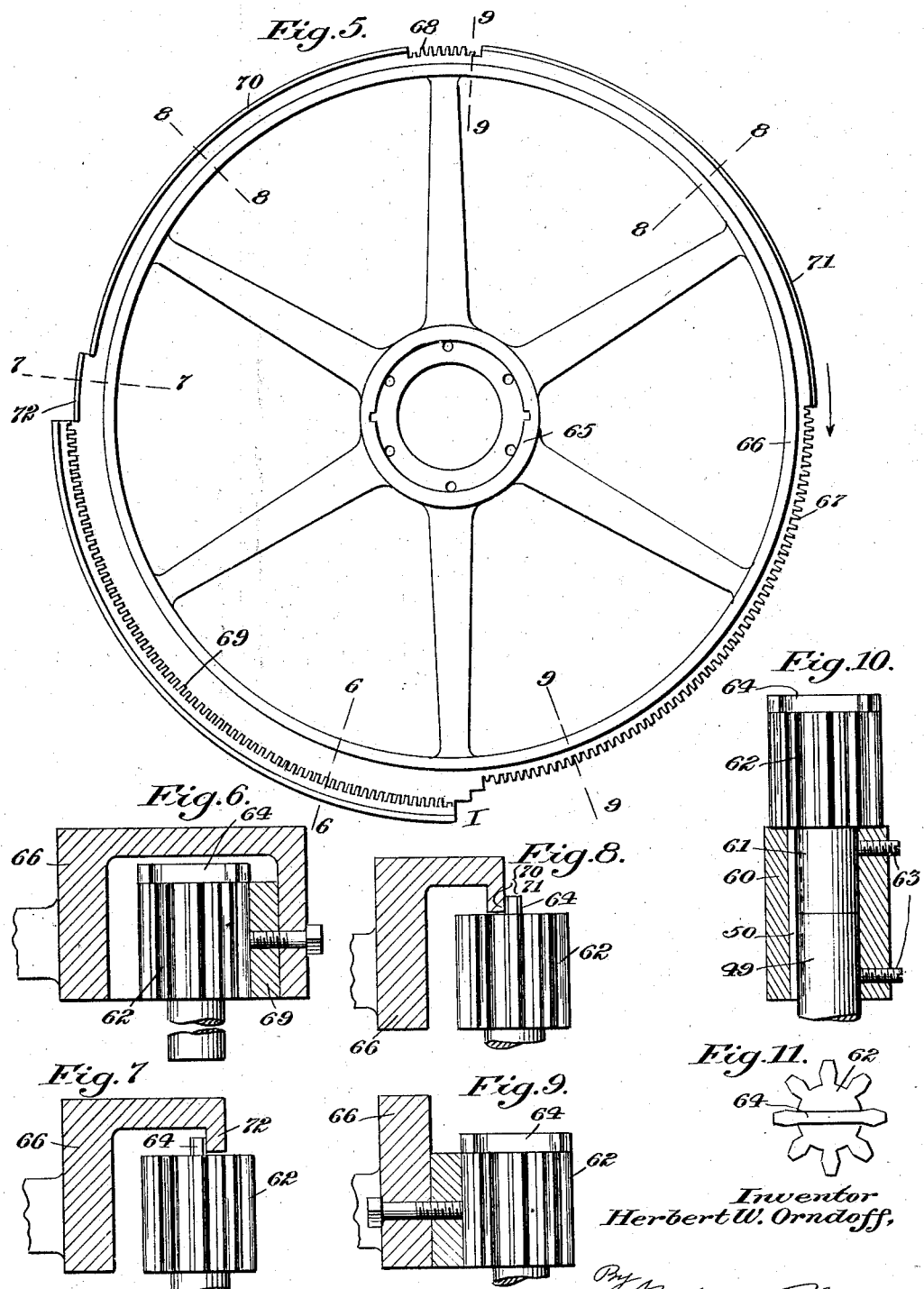

Nov. 25, 1930.  H. W. ORNDOFF  1,782,935
BAG TURNING MACHINE
Filed May 8, 1928   5 Sheets-Sheet 5

Inventor:
Herbert W. Orndoff,

Patented Nov. 25, 1930

1,782,935

UNITED STATES PATENT OFFICE

HERBERT W. ORNDOFF, OF NEW ORLEANS, LOUISIANA, ASSIGNOR TO THE E. V. BENJAMIN CO., INC., OF NEW ORLEANS, LOUISIANA, A CORPORATION OF LOUISIANA

BAG-TURNING MACHINE

Application filed May 8, 1928. Serial No. 276,118.

This invention relates to improvements in machines for turning or reversing bags.

One of the objects of this invention is to provide a bag turning machine which is provided with a plurality of bag turning units, each of which is adapted to receive a bag, and during the progression of the machine to effect the reversal or turning of the bag.

Another object of the invention is to provide a machine in which the units are arranged in turret form, the several units cooperating with a single operating mechanism to cause them successively and seriatim to pass through the receiving, reversing and discharge stations.

A further object of the invention is to provide a bag turning machine, which is adapted likewise to receive and position a liner during the turning operation.

Still another object of the invention is the provision of bag turning means which are adjustable so that bags of different sizes may be handled thereby.

A still further object of the invention is to provide a bag turning machine in which the parts are simple and not readily subject to physical damage even at the hands of inexperienced operators; and in which the operator is removed from contact or immediate access to dangerous parts of the mechanism.

Still another object of the invention is the provision of a bag turning machine in which the bag corners are correctly reversed.

With these and other objects in view as will appear in the course of the following specification and claims, one form of execution of a machine according to this invention is shown by way of example on the accompanying drawings.

In the drawings:

Figure 1 is a diagrammatic plan view of the arrangement of the bag turning machine, with the head gearing and associated parts removed for clearness, with the burlap liner and receiving tables of the delivery machine represented in their respective positions.

Fig. 2 is a vertical sectional view through the rotating table, stand, and head gear, substantially on line 2—2 of Fig. 1.

Fig. 3 is a side elevation of a portion of the rotatable table and head gear, with one of the bag turning units in face view.

Fig. 4 is a sectional view on line 4—4 of Fig. 1, showing the relationship of a bag turning unit to the delivery machine.

Fig. 5 is a bottom plan view of the head gear, on a larger scale than that of Fig. 2.

Figs. 6, 7, 8 and 9 are enlarged sections on, respectively, lines 6—6, 7—7, 8—8 and 9—9 of Fig. 5.

Fig. 10 is a detailed view of the connection between a threaded spindle and its head pinion.

Fig. 11 is a plan view of the upper end of a head pinion.

Figure 12:
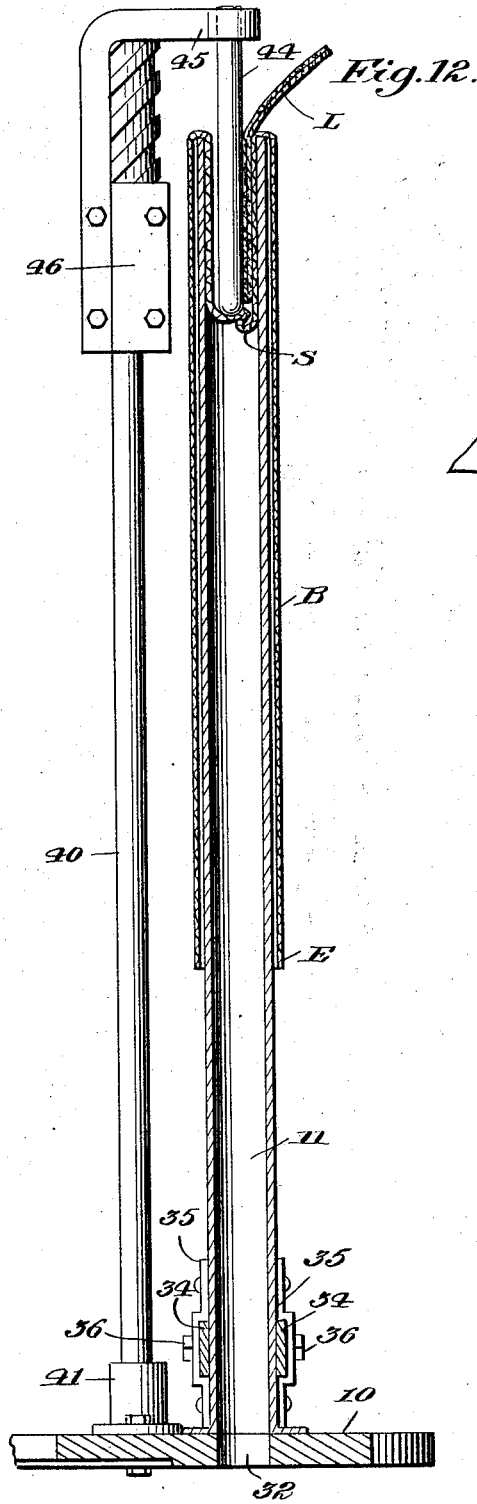

Fig. 12 is a view on an enlarged scale, in partial section, showing a bag tube and reversing rod, with a burlap bag and a liner bag in the partially turned position.

Figure 13:
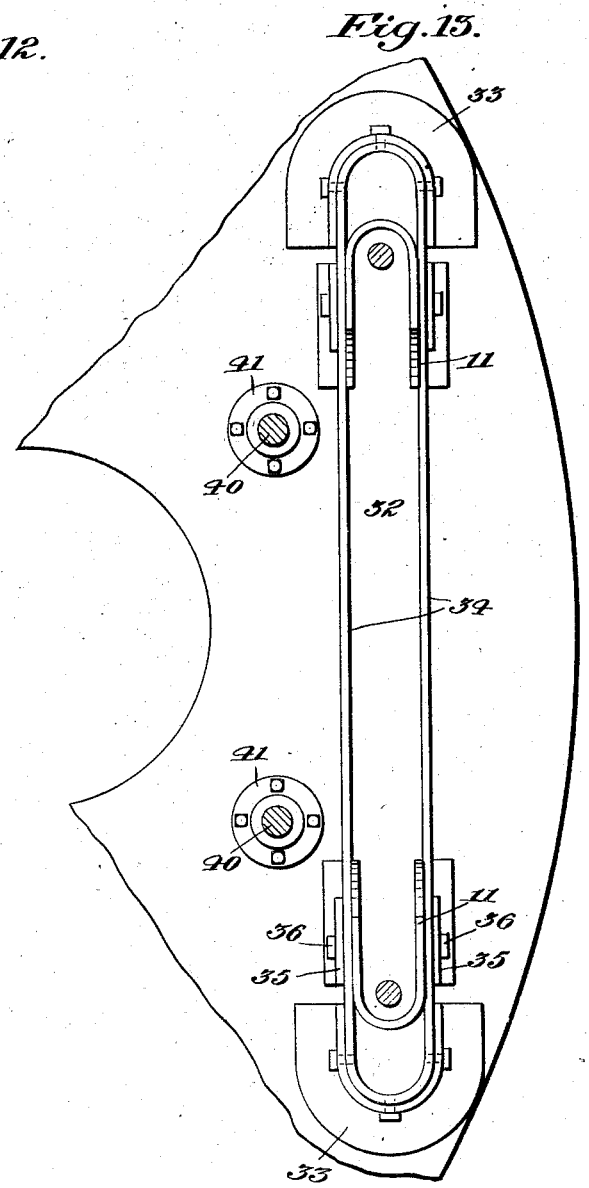

Fig. 13 is a fragmentary plan view corresponding to Fig. 12.

The bag turning machine, according to the present invention, provides a mandrel upon which the bag is placed "wrong side out" as it comes from the sewing machine, etc., by a "burlap operator". The mandrel is hollow and in the next stage of operation, a turning member moves into the mandrel, carrying the closed end of the bag with it; and then this turning member dwells or rests for an interval during which a second bag may be placed in position by a "liner operator". The next stage of operation is to complete the turning or reversing of the bag. Finally, the reversed bag is taken from the mechanism, which has accomplished the above operations, by a delivery machine which feeds the turned bag to a receiving table. It will be understood that the liner may be inserted or left out as desired.

In particular, the illustrated form of machine comprises a standard supported on a floor and having a vertical spindle about which rotates a turret mechanism having a number of turning units. Each of these turning units comprises a mandrel, a reversing member, and means for operating the reversing member from stage to stage in a complete cycle during one revolution of the rotating turret. In this way, the manual operations are performed at definite points of movement of each unit; so that it is unnecessary for an operator to change his position while attending the machine.

On the drawings, in Fig. 1 the machine is shown as comprising a table 10 having a plurality of mandrels located in spaced relationship thereon. In the present instance, six such mandrels are shown in a conventional way to comprise the pairs of U-shaped tube members 11, six pairs being here employed and traveling with the table 10 in its rotation. A delivery mechanism 44 is employed, as will be described hereinafter, to remove a turned bag from the turning machine and deliver it to a receiving table 13. The unit I in Fig. 1 is represented as delivering its turned bag to the machine 12. As the table turns in the direction of the arrow, to the position II, the bag turning members 44, which in the position I were entirely down, are withdrawn upwardly; so that when the unit reaches the position III, these rods are entirely withdrawn and the burlap operator can slip a bag as it comes from the sewing machine "wrong side out" over the pairs of tubes 11 by a simple quick hand operation, leaving the closed end of the bag across the top of the pair of tubes 11. As the machine continues to turn and the unit passes to the position IV, the bag turning members 12 are moved downward for, say six inches thus tucking the closed end of the bag downward into the space within the pairs of tubes 11, and forming a pocket of corresponding extent comprising the bottom of the turned bag. It will be understood that during the movement of the closed bag end, the sides of the bag have slid relatively upward on the outside of the tube members 11. A liner operator can now take a second bag to be used inside of a burlap or fabric bag and tuck its closed lower end into the small pocket formed within the upper ends of the pairs of tubes 11; if this insertion is accomplished, it is done during the "dwell" period referred to above, during which the bag turning members and the pairs of tubes have no relative movement, so that there is no danger of injury to the liner operator, and a certain and positive setting of the bottom of the liner in the bottom of the bag is assured. Thereafter, as the unit passes to the position VI and thence to the position I again, the bag turning members complete their downward stroke and force the closed end of the outer bag downward through an aperture in the table 10 into the reach of a delivery machine 12, so that this latter machine seizes the bag and withdraws it from the bag turning table 10. During this turning of the bag, the lining bag is carried along and is successively covered by the sides of the burlap or outside bag as these sides slide upward on the outside of the pair of tubes and then downward on the inside of the latter.

Turning to Figs. 2, 3 and 4, the machine is provided with a rigid base 20 which supports a vertical standard 21 formed for reasons of cheapness and lightness as a tube. This tube 21 serves as a vertical spindle for the rotational movement of the turret of which the bag turning element forms a lower element, as will be described hereinafter.

Likewise mounted on the base 20 is a shelf 22 to receive the thrust bearing 23 which supports the collars 24 and the bevel ring gear 25. These collars 24 are fixedly connected to the table 10, so that when the ring gear 25 is driven, the table is compelled to move therewith.

A lateral bracket 26 of the base 20 supports a bearing 27 for the main drive shaft 28 for the bag turning machine: this drive shaft having a bevel gear 29 meshing with the bevel gear 25 whereby to produce the movement of the turret.

Fixedly mounted on the table 10 and upstanding therefrom, in preferably conical arrangement with respect to the spindle 21, is a torque tube or hollow spindle 30 which at its upper end is fixedly connected to a top plate 31. The table 10 and the top plate 31 are formed to establish a smooth rotating fit upon the vertical spindle 21, whereby to guide the turret in rotation, while the weight of the parts is carried by the thrust bearing 23.

The turret above referred to comprises the table 10, the torque tube 30, the top plate 31, and certain parts associated therewith. These parts are connected together and rotate together during the operation of the machine.

The table 10 has spaced apertures 32 therein at the ends of which are mounted brackets 33 to support the connecting bars 34. These bars pass through the straps 35 at the sides of the tube members 11 and therewith support the tube members 11 in a position such that their straight, bent, outer sides are substantially at right angles to the table 10, i. e., they are perpendicular (Fig. 3). The bolts 36 are provided in the straps 35 to clamp the U-shaped tube members 11 at definite spaced distances with respect to each other.

The guide rods 40 are provided in pairs adjacent each slot 32, and are fastened at top and bottom to the table 10 and the top plate 31 by the sleeves 41. These guide rods therefore serve to hold the table 10 and top plate 31 in a fixed parallel relationship: and likewise serve as guides for the rectilinear movement of the sleeves 42 and crossheads 43. The crosshead 43 for each unit is formed of two spaced bars (Figs. 2 and 3) between which may be inserted and clamped the bag turning rods 44 which are guided immediately above the upper open end of the tube members 11 by a bracket 45 fixedly mounted by clamps 46 on the guide rods 40. The clamps 46 are joined by a web 47 having a sleeve bearing 48 for the lower end of the operating spindle 49. The upper end of the operating spindle 49 is slightly reduced in diameter and formed cylindrically, and provided with a key-way to receive a coupling key 50 (Fig. 10). The threaded spindle 49 for each unit passes through a traveling nut 51 of the corresponding crosshead 42.

Mounted on the table 10 and on the top plate 31 are the brackets 52 supporting the guide pulleys 53 for the traveling cable 54. This cable is connected to a projection 55 of the traveling crosshead 42 of the respective unit intermediate its length: while the ends of the cable are joined by a heavy turnbuckle 56 which serves the double purpose of preventing slackness in this cable and of furnishing a counterbalance or counterweight for the traveling crosshead 42 and its connected parts, including the bag turning members 44.

The upper end of the threaded operating spindle 49 is journaled in the top plate 31 and above this plate its end is presented in a connecting bushing 60 which likewise receives the keyed stub 61 of a respective head pinion 62. The head pinions of all units have the same number of teeth: and the units are otherwise identical in construction. It will be seen that the sleeve 60 and key 50 hold the pinion 61 and the threaded operating spindle 49 positively together for movement. Adjusting screws 63 are provided to take up any slackness in this connection.

The pinion 62 is provided at its top with a fin or rib 64 extending across the same.

Fixedly mounted on the stationary spindle 21 is the hub 65 of the head gear 66. As shown in Fig. 5, this head gear is formed with parts comprising an externally cut inner mutilated gear 67, 68, an internally cut outer gear 69, and smooth flanges 70, 71, 72. The gear teeth 67, 68, 69 of the head gear 66 are intended to mesh successively with the pinions 62 of the individual bag turning units as the turret supporting the latter revolves beneath the head gear, while the flanges 70, 71, 72 constitute Geneva plates to prevent movement of these pinions except when in actual engagement with the teeth of the head gear. The same number of teeth are provided on the externally cut inner gear 67, 68 and on the internally cut outer gear 69.

Since Fig. 5 represents a bottom plan view of this head gear, it is apparent that as the turret table revolves, the respective pinion 62 will travel in a clockwise direction with respect to the showing of the head gear in Fig. 5, as indicated at the arrow at the right of the figure. In tracing the movement of a single pinion from the position I in Fig. 1 through its cycle, it will be noted that the pinion 62, when the unit is in the position I, will be at the lowermost point of Fig. 5, between the ends of the two gears 69 and 67. As the pinion moves in a clockwise direction, it meshes with the internally cut outer gear 69 (Fig. 6) and the spindle 49 is rotated therewith, whereby to raise the cross-head 42 until the bag turning members 44 are entirely drawn from the tubes 11, into the position shown at the left of Fig. 2. This corresponds to the position III in Fig. 1. After the pinion has traversed the quadrant of the internally cut gear 69, its upper fin 64 is brought against the flange 72, the last tooth of the gear 69 being mutilated whereby to permit the pinion 62 thereafter to slide along this flange 72 in the position shown in Fig. 7. It will be noted that the fin 64 is inside of the flange 72: and after traversing a short distance, this flange 72 is replaced by a concentric flange 70 which contacts with the inner surface of the fin 64 and continues to keep the spindle 49 from rotating (Fig. 8).

The pinion thereafter comes into contact with a short segment 68 of the externally cut inner gear (Fig. 9), whereby it is rotated sufficiently to cause the threaded spindle 49 to move and by its action with the threaded traveling nut 51 to push downward on the bag turning members 44, whereby to tuck the end of the bag to form a pocket. Immediately thereafter the fin 64 is brought into contact with a further flange member 71, which again holds the threaded spindle 49 against rotation, the relationship of the parts being again as shown in Fig. 8. The angular distance represented by the flange 71 is, therefore, a dwell following an initial formation of a pocket by the closed end of the bag being turned. At the end of this dwell, the spindle again comes in contact with the further externally cut segment 67 of the inner gear (again as in Fig. 9), which then rotates the pinion 62 until the spindle 49 has rotated sufficiently to cause the bag turning members 44 to pass downward within the tubes 11 and even to project beneath the bottom of the table 10 (Fig. 4).

The pinion then leaves the gear 67 and reengages with the gear 69: and the cycle is repeated. It will be noted that the several gears, segments or circular racks have their end teeth mutilated to insure a proper engagement with the gear and with the Geneva flange, as required.

The relationship of the tube 11, one of the bag turning members or rods 44, and the burlap bag B, is shown in Fig. 12, which represents the position of the respective parts immediately at the formation of the pocket and during the dwell above referred to. The end of the bag B is shown as having a seam S to close this end: which has just been tucked into the tube 11 by the rod 44 to form this pocket, into which the burlap operator has just inserted the second bag or liner L. It will be noted that when the downward movement of the rod 44 again starts, the rod will push the bag end having the seam S downward within the tube 11 and out of the aperture 32 in the table 10: while maintaining the liner L in position in the bag. During the downward movement of the closed end of the bag, the open end E will slide successively upward on the tube 11.

As shown in Fig. 4, when the bag turning member 44 has passed through the hole 32 in the table 10, it forces the bag, now completely turned, between the delivery belt 80 which travels over the guide roller 81, and a seizing roller 82. This seizing roller 82 is carried on a rocker 83 having a spring 84 to hold the roller against the belt 80, so that when the return movement of the bag turning member 44 of Fig. 4 starts, the tape or belt 80 and the roller 82 will already have drawn the end of the bag downward from the bag turning members 44, and begun to draw it upward in the delivery machine between the tapes 80 and 85.

In order to adjust the machine for different widths of bags, the bag holding elements, being the tubes 11, are adjusted along the bars 34 until their outer edges are at the required distances; preferably keeping the tubes equally spaced from the center line. The plunger bag turning elements 44 are adjusted likewise in their brackets to be received within the tubes 11, which may be accomplished by releasing the clamping plates 43 and moving the upper ends of the bars together to the required extent, and by locating the rods 44 within other apertures of the bracket 45, or by providing another bracket having different spacings of its guiding holes.

It is obvious that the invention is not limited to the form of construction shown, but that it may be modified in many ways within the scope of the appended claims.

What I claim as new and desire to secure by Letters Patent is:

1. In a bag turning machine, a moving support, a bag holding member located on said support, a bag turning element carried on and guided by said support for movement with respect to the bag holder whereby to reverse a bag located on the latter, and means to move the bag turning element in one direction during one part of the movement of the support, and to return it during another part of such movement, said bag turning element being held against movement during a part of the movement of the support while the said element is free of the bag holding means.

2. In a bag turning machine, a moving support, a bag holder located on said support, a bag turning element movable on said support with respect to said bag holder whereby to turn a bag located on the latter, and means to move the bag turning element to a position free of said bag holder so that a bag may be placed upon the holder, said means thereafter acting to partially turn the bag and then maintaining the bag turning element against movement for a time during which a liner may be inserted, and thereupon completing the turning operation and enclosing the liner within the bag, said means later serving to return the bag turning element to a position free of the bag holder for the placing of another bag.

3. In a bag turning machine, a rotating turret, a plurality of bag turning units located on said turret and each comprising a bag holder and a bag turning element, and means operated by the rotation of said turret to move the bag turning element of each unit through a cycle comprising the withdrawal of the turning element from the holder so that a bag may be placed upon the holder, while the element is maintained out of engagement therewith, thereafter moving the element to turn the bag, and then withdrawing the element for the placing of a further bag.

4. In a bag turning machine, a turret, a plurality of bag turning units located on said turret and each comprising a bag holder and a bag turning element, and means operated by the rotation of the turret to act seriatim upon the turning elements of the several units so that successive turning elements are held free of the holder for the placing of a bag on the latter, thereafter operating to partially turn the bag and then be held in such partially moving position so that a liner may be inserted in the bag, thereupon to complete the turning of the bag and finally to return the respective element to a position free of the holder so that another bag may be placed upon the same.

5. In a bag turning machine, a turret comprising a table and a head, means connecting the table and the head to hold them in spaced parallel position for movement with one another, bag holding tubes on the table, said spacing means for the table and head including connecting rods, bag turning plungers guided in their movement by said rods, and means to move the plungers and operated by the rotation of the turret.

6. Bag turning machine as in claim 5, in which pulleys are provided on the table and head, with a cord passing over the same and connected to a corresponding plunger, and a counterweight on the cord to counterbalance the plunger.

7. In a bag turning machine, a support, a mutilated gear, said support and gear being adapted to move relative to one another, a bag holder on said support, a plunger movable on said support into and out of engagement with the bag holder whereby to turn a bag located on the same, and a device including a pinion meshing with the mutilated gear to move said plunger.

8. A bag turning machine as in claim 7, in which means are provided in fixed relationship to the mutilated gear to hold the pinion against movement except when in mesh with the gear.

9. A bag turning machine as in claim 7, in which a guide flange is provided between portions of the mutilated gear, and means are provided rigid with the pinion to contact the flange whereby to prevent rotation of the pinion except when in mesh with the gear.

10. In a bag turning machine, a rotating table, said table having spaced slots therein, supporting bars extending substantially parallel to the respective slots, and bag holding tubes mounted substantially at right angles to the surface of the table and adjustable along the length of the bars and opposite the slots, and means to secure the tubes at definite distances apart, whereby the distance between the tubes may be varied to accommodate bags of different sizes.

11. In a bag turning machine, a support including a rotatable table having slots therein, bag holding tubes mounted on the table above the slots and extending at right angles to the upper surface of the table, bag turning elements and means to move the same between the tubes and through the slots whereby to turn bags located on the tubes, and a delivery mechanism to seize the respective bags from the plunger when the latter have projected through the table.

12. In a bag turning machine, a support, a bag holder and a bag turning element mounted on said support, said member and element being movable with respect to each other, and a fixed member including a mutilated gear in three portions, cut internally and externally, the number of internally cut teeth being equal to the number of externally cut teeth, a pinion meshing successively with said teeth so that during a relative rotation of said support with respect to the fixed member, the pinion will rotate by equal angular distances in each direction, and a connection from said pinion to the bag turning element whereby to operate the latter.

13. In a bag turning machine, a turret comprising a table and head members, means to hold said members parallel and spaced and connected to each other for simultaneous movement, a plurality of bag holders mounted on the table, a plurality of threaded spindles journaled in the head, each spindle being located opposite a bag holder, a traveling nut on each spindle, a bag turner element connected to said nut, a fixed member, and means on the head to cooperate with said fixed member to rotate the spindles to move the respective bag turning elements with respect to the bag holders during the relative rotation of the fixed member and turret.

14. In a bag turning machine, a fixed member having concentric portions of internally and externally cut racks, flanges between the ends of the rack portions, a rotating turret, a pinion journaled on said turret and engaging successively with said rack portions, a bag holder on said turret, a bag turner element carried by said turret in alinement with the bag holder whereby to be moved with respect to the same to turn a bag located on the bag holder, and connections between the pinion and the element to move the latter.

I testimony whereof, I affix my signature.

HERBERT W. ORNDOFF.